United States Patent
Chen et al.

(10) Patent No.: US 9,333,654 B2
(45) Date of Patent: May 10, 2016

(54) ROBOT PARTS ASSEMBLY ON A WORKPIECE MOVING ON AN ASSEMBLY LINE

(75) Inventors: Heping Chen, Austin, TX (US); George Zhang, Shanghai (CN); Thomas A. Fuhlbrigge, Ellington, CT (US)

(73) Assignee: ABB Research Ltd., Zurich (CH)

( * ) Notice: Subject to any disclaimer, the term of this patent is extended or adjusted under 35 U.S.C. 154(b) by 927 days.

(21) Appl. No.: 12/934,850

(22) PCT Filed: Mar. 30, 2009

(86) PCT No.: PCT/US2009/038754
§ 371 (c)(1),
(2), (4) Date: Dec. 8, 2010

(87) PCT Pub. No.: WO2009/123956
PCT Pub. Date: Oct. 8, 2009

(65) Prior Publication Data
US 2011/0087360 A1    Apr. 14, 2011

Related U.S. Application Data (60) Provisional application No. 61/040,736, filed on Mar. 31, 2008.

(51) Int. Cl.
*G06F 19/00* (2011.01)
*B25J 9/16* (2006.01)

(52) U.S. Cl.
CPC ..... *B25J 9/1697* (2013.01); *G05B 2219/39387* (2013.01); *G05B 2219/40554* (2013.01); *G05B 2219/45021* (2013.01)

(58) Field of Classification Search
CPC ........... G05B 2219/45021; G05B 2219/40554; G05B 2219/39387; B25J 9/1697

USPC ......... 700/114, 117, 245, 246, 253, 259, 264; 901/9, 31, 47, 50
See application file for complete search history.

(56) References Cited

U.S. PATENT DOCUMENTS 4,694,230 A * 9/1987 Slocum et al. ........... 318/568.17
4,984,085 A * 1/1991 Landowski .................... 348/243
(Continued)

FOREIGN PATENT DOCUMENTS

WO      WO03/072315      9/2003
WO      PCT/2009/038754  3/2009

OTHER PUBLICATIONS

Cho, "Marc-micro manipulation with visual tracking and its application to wheel assembly", Sep. 2005, International Journal of control, Automation, and Systems, vol. 3 No. 3, pp. 461-468.*
Lippiello, A Position-Based Visual Impedance Control for Robot Manipulators, 2007.*

(Continued)

*Primary Examiner* — Jason Holloway
*Assistant Examiner* — Rachid Bendidi
(74) *Attorney, Agent, or Firm* — Taft Stettinius & Hollister LLP (57) ABSTRACT

An industrial robot is used to assemble a part to a predetermined location on a randomly moving workpiece. The workpiece may be an automobile on an assembly line and the part may be a wheel (a tire mounted on a rim) to be assembled on one of the wheel hubs of the automobile. The robot has mounted on it a camera, a force sensor and a gripper to grip the part. After the robot grips the part, signals from both the force sensor and vision are used by a computing device to move the robot to a position where the robot can assemble the part to the predetermined location on the workpiece. The computing device can be the robot controller or a separate device such as a PC that is connected to the controller.

10 Claims, 7 Drawing Sheets

(56) References Cited

U.S. PATENT DOCUMENTS

| | | | | |
|---|---|---|---|---|
| 5,040,056 | A | * | 8/1991 | Sager et al. ............... 348/88 |
| 6,140,788 | A | * | 10/2000 | Watanabe et al. ........ 318/568.22 |
| 6,141,863 | A | * | 11/2000 | Hara et al. ............... 29/714 |
| 6,204,620 | B1 | * | 3/2001 | McGee et al. ........... 318/568.11 |
| 6,313,595 | B2 | * | 11/2001 | Swanson et al. ......... 318/568.11 |
| 6,553,652 | B2 | * | 4/2003 | Sakakibara et al. ............ 29/709 |
| 6,681,151 | B1 | * | 1/2004 | Weinzimmer et al. ........ 700/259 |
| 6,816,755 | B2 | * | 11/2004 | Habibi et al. ................ 700/259 |
| 6,941,645 | B2 | * | 9/2005 | Kosuge et al. ................. 29/714 |
| 7,138,780 | B2 | * | 11/2006 | Stahs ...................... 318/568.11 |
| 2004/0172164 | A1 | * | 9/2004 | Habibi et al. ................ 700/245 |
| 2006/0111810 | A1 | * | 5/2006 | Kim et al. .................... 700/186 |
| 2007/0073439 | A1 | * | 3/2007 | Habibi et al. ................ 700/213 |
| 2008/0312769 | A1 | * | 12/2008 | Sato et al. .................... 700/249 |
| 2010/0049352 | A1 | * | 2/2010 | Kohlmaier et al. ........... 700/103 |
| 2010/0113106 | A1 | * | 5/2010 | Supran ......................... 455/573 |

OTHER PUBLICATIONS

Lippiello et al: "A Position-Based Visual Impedance Control for Robot Manipulators." Robotics and Automation, 2007 IEEE International Conference on, IEEE, PI, Apr. 1, 2007, pp. 2068-2073, XP031091107, ISBN: 978-1-4244-0601-2 p. 2068-2069. fig 2.

R.J.Tasi: A Versatile Camera Calibration Technique for High Accuracy 3D Machine Vision Metrology Using Off-the-Shelf TV Cameras and Lenses, IEEE Journal of Robotics and Automation, vol. 3, No. 4, 1987, pp. 323-344.

Z.Zhang, "A Flexible New Technique for Camera Calibration," IEEE Transaction on Pattern Analysis and Machine Intelligence, vol. 22, Issue 11, Nov. 2000 pp. 1330-1334.

Sciavicco et al: "Modeling and Control of Robot Manipulators", Second Edition (Dec. 31, 2003), Springer, ISBN: 1852332212, table of contents, pp. 218-227, 280-285, 321-326.

* cited by examiner

ROBOT PARTS ASSEMBLY ON A WORKPIECE MOVING ON AN ASSEMBLY LINE

FIELD OF THE INVENTION

This invention relates to the use of robots for assembly of parts on a workpiece that is moving randomly on an assembly line.

DESCRIPTION OF THE PRIOR ART

Assembly tasks using industrial robots have increased in both number and complexity over the years because of the increasing requirements of product quality and quantity. However, robots performing assembly tasks are still a small portion of total robot sales each year. One of the main reasons is that it is difficult for conventional industrial robots to adjust to any sort of change such as those that may occur when the workpiece on which the parts are to be assembled is moving on an assembly line. Therefore, more intelligent industrial robotic systems are rapidly expanding the realms of possibility in assembly applications because they can perform assembly tasks with high autonomy and adaptability to the environments.

Moving line assembly, that is an assembly of parts performed while the workpiece is moving, is based on information from vision, force and position sensors. In moving line assembly, the robot can track the moving workpiece while performing the assembly process. Compared to stop-station assembly, that is, an assembly which is performed when the parts are stationary, moving line assembly can save huge amounts of time and resources.

U.S. Pat. No. 7,138,780 describes a method of processing a workpiece with a tool during a continuous movement of the workpiece, with the workpiece and tool both moving with a constant velocity. This makes the synchronization of the workpiece and tool much simpler because it can be done in the robot programming and external sensors are riot needed. U.S. Pat. No. 7,236,850 describes a method for tracking the motion of a moving object. The tracking is only performed along one direction (the moving direction). This is similar to the well known one directional conveyor tracking that uses the encoder method. Also the tracking is based on the displacement. This could cause tracking errors and eventually the failure of an assembly process.

U.S. Pat. No. 6,886,231 describes a stop-assembly-station system that includes a vision system. The vision system is used to identify the position/orientation of the part. The assembly is carried out by using the vision system alone. A vision and force control based stop-station assembly system is described in U.S. Pat. No. 6,141,863. The force control is used to execute the insertion task on the stationary workpiece and the vision system is used to identify the position/orientation of a part. Therefore, no speed control is involved in the process since the workpiece is stationary.

U.S. Pat. No. 5,040,056 describes a part picking up system. The part position/orientation is identified by the vision system and the data is transferred to the robot to pick up the part. Although the conveyor is moving, the vision system is used only for position/orientation identification. Therefore, no visual serving is involved.

There are many research papers about moving line tracking, such as Changhyun Cho, Sungchul Kang, Munsang Kim, and Jae-Bok Song, "Macro-Micro Manipulation with Visual Tracking and its Application to Wheel Assembly", The International Journal of Control, Automation, and Systems, vol. 3, no. 3, pp. 461-468, September 2005 and Ik Sang Shin, Sang-Hyun Nam, Hyun Geun Yu, Rodney G. Roberts, Seungbin B. Moon1, "Conveyor Visual Tracking using Robot Vision", 2006 Florida Conference on Recent Advances in Robotics, FCRAR 2006. These systems use only visual serving to track the motion of the parts to perform the assembly tasks.

A 3D vision system, that is, stereo vision, can be used to identify the position errors during the tracking of the moving workpiece. The processing of stereo vision information enables a robot to determine the position and orientation of an object in the robot coordinate frame. However, an accurate calibration between the camera coordinate system and robot coordinate system has to be realized. Because the stereo vision system requires high quality cameras and accurate calibrations, these systems are costly, error prone and not robust enough for daily use in the workshop. The complicated computation for determining the position/orientation of an object makes this system difficult to implement in real time applications, especially for fast motion tracking. Also visual serving alone could cause damage to the final products if the stereo vision system malfunctions.

SUMMARY OF THE INVENTION

An apparatus for controlling an industrial robot having an end arm to assemble a part to a predetermined location on a randomly moving workpiece, the robot having a force sensor mounted on the end arm and a tool mounted to the force sensor and a vision system mounted on the robot. The apparatus has:

a computational device configured to cause the robot to grip the part with the tool mounted to the force sensor and use signals from the vision system to compute a position and size of a predefined feature located on the workpiece at other than the predetermined location to establish a positioning relationship between the predetermined location and the predefined feature located on the workpiece and then using the positioning relationship and signals, at the same time, from both the force sensor mounted on the robot end arm and the vision system of the predetermined location to control movement of the robot gripping the part with the tool mounted to the force sensor to a position where the gripped part can be assembled by the robot to the predetermined location on the randomly moving workpiece.

A method for using an industrial robot having an end arm to assemble a part gripped by the robot to a predetermined location on a randomly moving workpiece comprising:

using in a computational device signals from a vision system mounted on the robot to compute a position and size of a predefined feature located on the workpiece at other than the predetermined location to establish a positioning relationship between the predetermined location and the predefined feature located on the workpiece; and using the positioning relationship and signals, at the same time, from both a force sensor mounted on the end arm and the vision system of the predetermined location to control movement of the robot gripping the part with a tool mounted to the force sensor to a position where the gripped part can be assembled by the robot to the predetermined location on the randomly moving workpiece.

A system for controlling an industrial robot to assemble a part to a predetermined location on a randomly moving workpiece comprising:

an industrial robot comprising an end arm, a force sensor mounted on the end arm and a tool mounted to the force sensor and a vision system mounted on the robot; and a computational device connected to the robot and configured to control the robot, the computational device responsive to signals from the vision system to compute a position and size of a predefined feature located on the workpiece at other than the predetermined location to establish a positioning relationship between the predetermined location and the pre-defined feature located on the workpiece and then use the positioning relationship and signals, at the same time, from both the force sensor and the vision system of the predetermined location to control movement of the robot after the robot has gripped the part with the tool mounted to the force sensor to a position where the gripped part can be assembled by the robot to the predetermined location on the randomly moving workpiece.

A system controlling an industrial robot having an end arm to assemble a part to a predetermined location on a randomly moving workpiece, a force sensor mounted on the end arm and a tool mounted to the force sensor the control system having a computing device having therein program code usable by the computing device. The program code has:

code configured to cause the robot to grip the part using the tool mounted to the force sensor; and code configured to use signals from a vision system mounted on the robot to compute a position and size of a predefined feature on the workpiece at other than the predetermined location to establish a positioning relationship between the predetermined location and the predefined feature located on the workpiece and then use the positioning relationship and signals, at the same time, from both the force sensor mounted on the robot end arm and the vision system of the predetermined location to control movement of the robot to a position where the gripped part can be assembled by the robot to the predetermined location on the randomly moving workpiece.

A computer program product on a tangible media for controlling an industrial robot having an end arm, a force sensor mounted on the end arm and a tool mounted to the force sensor to assemble a part gripped by the tool to a predetermined location on a randomly moving workpiece, the computer program product comprising:

computer usable program code configured to cause the robot to grip the part with the tool; and computer usable program code configured to use signals from a vision system mounted on the robot to compute a position and size of a predefined feature on the workpiece at other than the predetermined location to establish a positioning relationship between the predetermined location and the predefined feature located on the workpiece and then use the positioning relationship and signals, at the same time, from both the force sensor mounted on the robot end arm and the vision system of the predetermined location to control movement of the robot to a position where the part gripped by the tool can be assembled by the robot to the predetermined location on the randomly moving workpiece.

DETAILED DESCRIPTION

There is described herein a method and apparatus for controlling an industrial robot to perform the assembly of a part to a workpiece based on the synergistic combination of vision, force and position as the feedback information to control the robot motion while the workpiece is moving randomly. The speed errors are computed and the speed of the robot is controlled such that the tool that holds the part to be assembled to the moving workpiece tracks the motion of the randomly moving workpiece. A single camera with simple calibration combined with force control is used. As is described in more detail below, force control is applied to control the motion of the robotic system to perform the assembly task on the randomly moving workpiece.

The method and apparatus is described below, by way of example and not of limitation, in connection with the process of loading a wheel on the hub of a motor vehicle moving on an assembly line. As is described below, in this example:

1. A 2D vision system, that is, a single camera, identifies the position/orientation of the wheel and the robot tool is controlled to pick up the wheel.

2. The robot moves to a first position that is taught manually to the robot. The first position is related to a first trigger on the moving assembly line. The camera takes an image when the moving assembly line, that is, the conveyor that moves the workpiece to the workstation where the robot is located, triggers the first trigger. After image processing, the orientation pattern of the bolts or studs on the hub is identified. The robot additional axis rotates to match the holes on the wheel to the bolts on the hub.

3. While the additional axis is rotating, the robot moves to the second position that is also taught manually to the robot. When a second trigger that is also on the moving assembly is triggered, the robot controller or a computing device connected to the controller computes the speed errors of the moving workpiece and tracks the workpiece. At the same time, force control is enabled along all directions. The robot moves towards the hub because of force control along the Z-axis.

4. After the contact force along the Z-axis reaches a certain value, the assembly of the wheel to the hub is completed and the force control along the negative Z-axis retracts the tool.

5. The force control along all directions also keeps the system safe under abnormal conditions. For example, when the vision system sends the wrong signals, the force control balances the wrong signals and will not cause damage to the system and the product.

Figure 1:
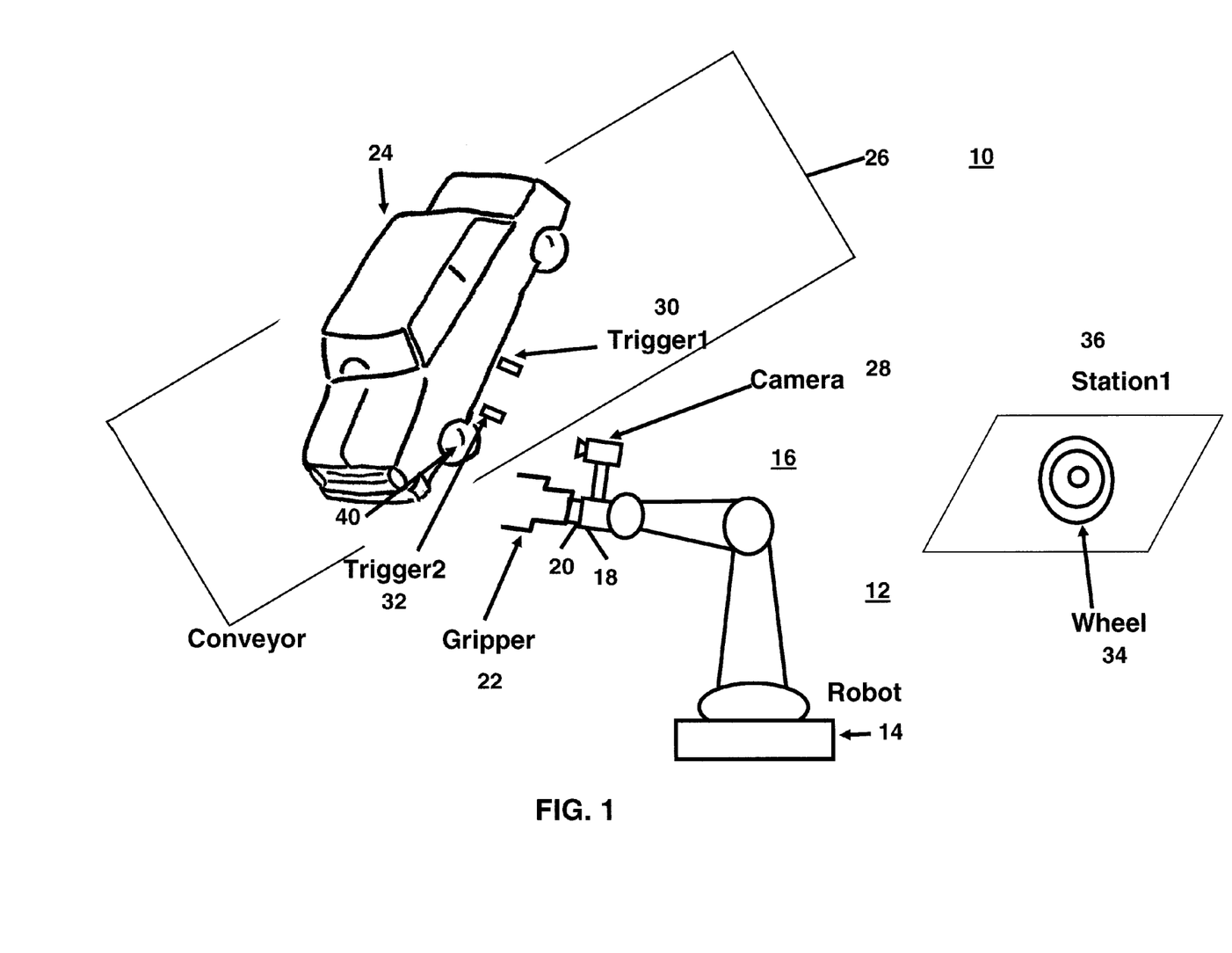
FIG. 1 shows a system wherein a robot mounts a wheel to the hub of motor vehicle moving on an assembly line.
Figure 7:
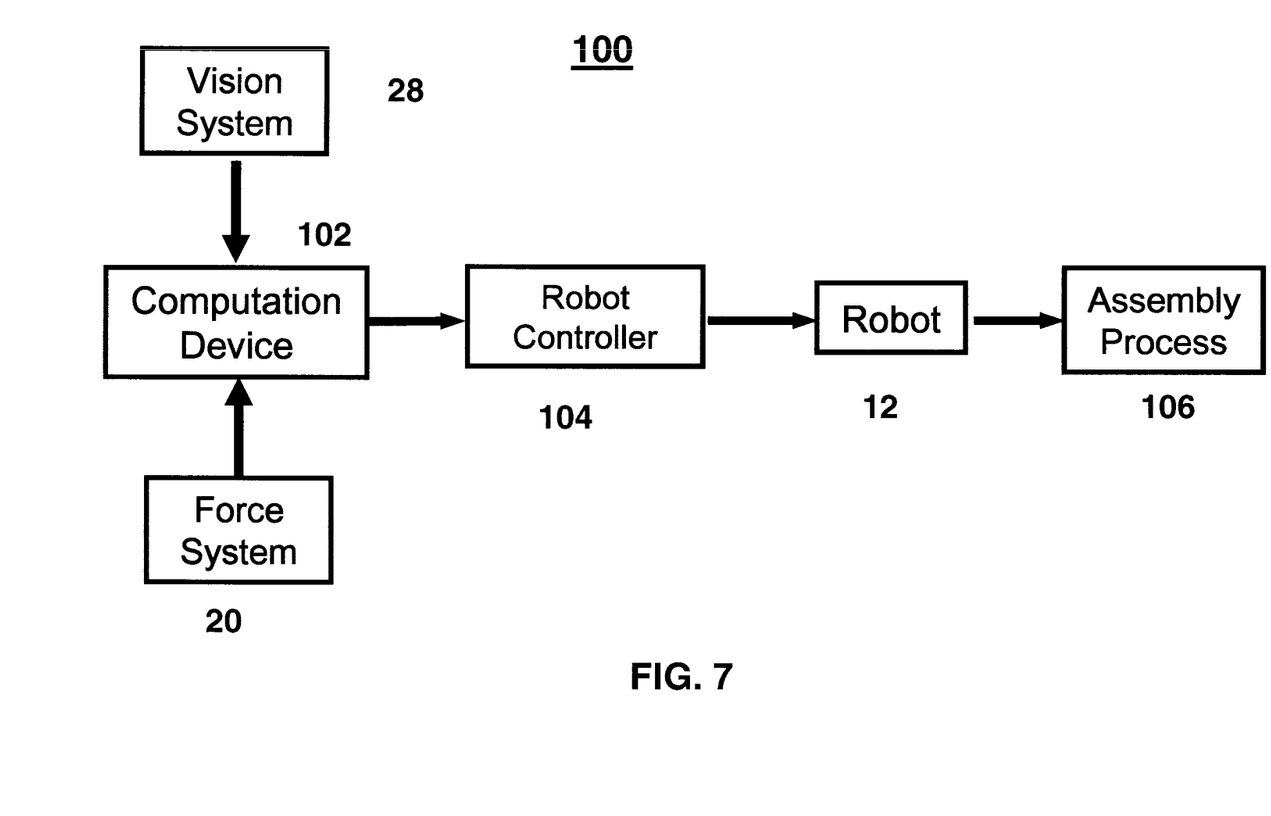
FIG. 7 shows an embodiment in which a computing device that receives signals from the camera and force sensor is connected to the robot controller.

FIG. 1 illustrates a system 10 wherein using the method and apparatus described herein an industrial robot 12 mounts a wheel 34 on a work piece 24 randomly moving on an assembly line 26. The system 10 includes the robot 12 that has a base 14 and a moveable arm assembly 16 supported on the base 14. The end 18 of the arm 16 supports a 6-DOF force sensor 20, which in turn supports a gripper 22 that is used to perform an assembly of a part, which in this instance is the wheel 34, on the randomly moving work piece 24, which in this instance is an automobile. As is shown in FIG. 7, the robot 12 has an associated controller 104.

In this example, the assembly is the mounting of the wheel 34 on hub 40 of the work piece 24. The wheel is shown for ease of illustration in FIG. 1 as three concentric circles. It is well known that since the work piece 24 shown in FIG. 1 is an automobile, the wheel 34 is the combination of a tire mounted on a rim. It is also well known that the rim has holes arranged in a pattern that matches the pattern of the bolts on hub 40 on work piece 24 to which the wheel is to be mounted and a hole in its center so that the wheel 34 can be attached to the center of the hub 40. The hole in the center of the rim is represented by the innermost of the three concentric circles shown in FIG. 1. The holes in the rim that match the pattern of the bolts on the hub are not shown in FIG. 1. The middle circle represents the outer edge of the rim. The outer edge of the tire mounted on the rim is represented by the outermost circle.

As is shown in FIG. 1, work piece 24 is moving on the assembly line 26. A camera 28 is mounted on the end of the arm 16. There are two triggers, trigger 1 30 and trigger 2 32, on the moving assembly line 26 to synchronize the motion of the robot 12 and the line 26.

Figure 2:
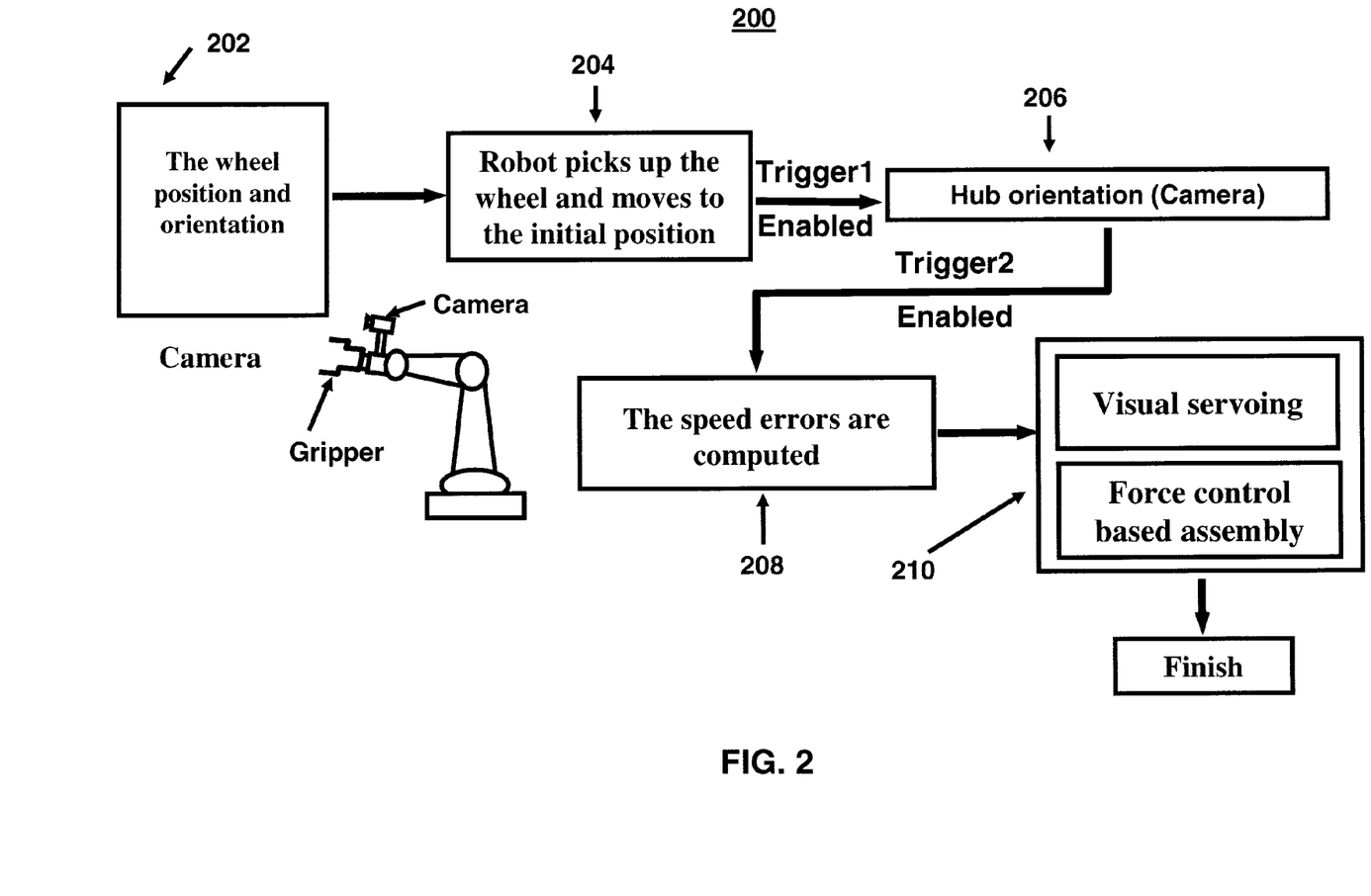
FIG. 2 shows the process flow for forming the assembly task shown in FIG. 1.

FIG. 2 shows the process flow 200 for performing the assembly task shown in FIG. 1. As is described in block 202, the robot 12 moves to station 1, 36 in FIG. 1, so that the robot gripper 22 can pick up the wheel 34. The camera takes an image of the wheel 34 and the position/orientation of the wheel 34 is identified. The robot gripper 22, as is described in block 204, picks up the wheel 34 and moves to a first position related to trigger 1 near the moving assembly line 26.

When the moving work piece 24 enables trigger 1 this is an indication that the hub 40 can be seen by camera 28. The camera 28 takes an image and as is described in block 206 the position/orientation of the hub 40 onto which the wheel 34 is to be mounted by the robot 12 is identified by the robot controller 104. The additional axis, which is used to rotate the wheel 34 to match the bolts on the hub 40 and the holes on the wheel 34, rotates the held wheel 34 a certain angle to align the bolts on the hub 40 and the holes on wheel 34 while the robot 12 moves to the second position. The second position, which is related to trigger 2, is used to synchronize the robot 12 with the moving line 26.

Figure 6:
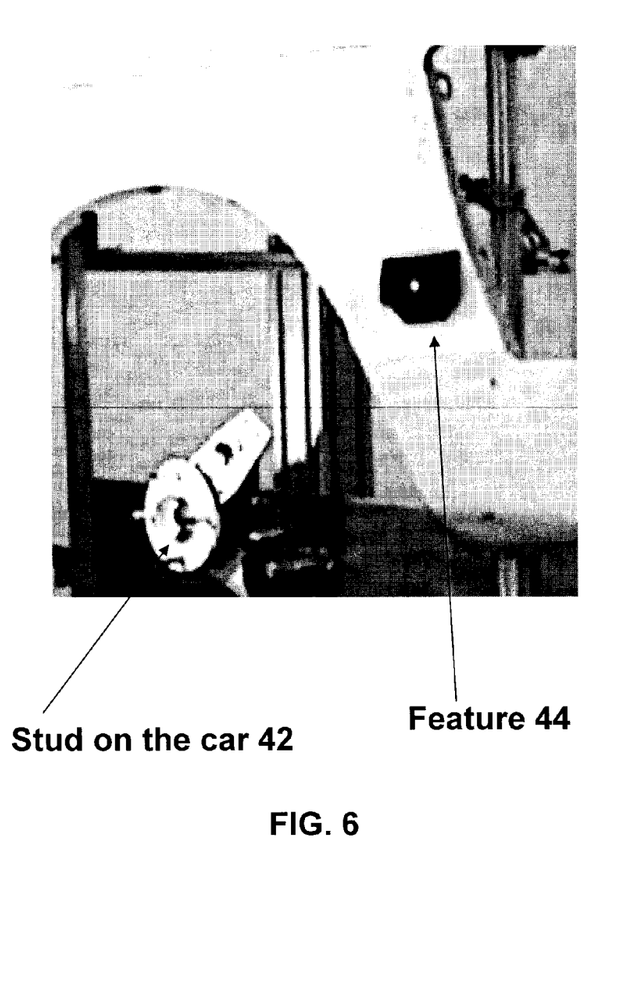
FIG. 6 shows a laboratory mock-up of part of a motor vehicle body with the pre-defined feature and the studs on the wheel hub.

When the moving work piece enables trigger 2, the camera 28 takes images continuously and the position errors of a pre-defined feature on the car body 24 is computed by the robot controller 104. One example of such a feature 44 is shown in FIG. 6. The pre-defined feature 44 can be a feature that is on the car body 24 when the car is sold or an artificial marker that is placed on the car body 24 to be used during assembly of the car.

Using the Jacobian matrix described below, the speed errors are calculated (block 208) and at block 210 the robot 12 is controlled to follow the motion of the conveyor 26 while force control is enabled to perform the assembly task. After the wheel 34 is inserted into the hub 40, the gripper 22 releases and force control along the reverse insertion direction retracts the gripper 22 from the hub 40.

Figure 3:
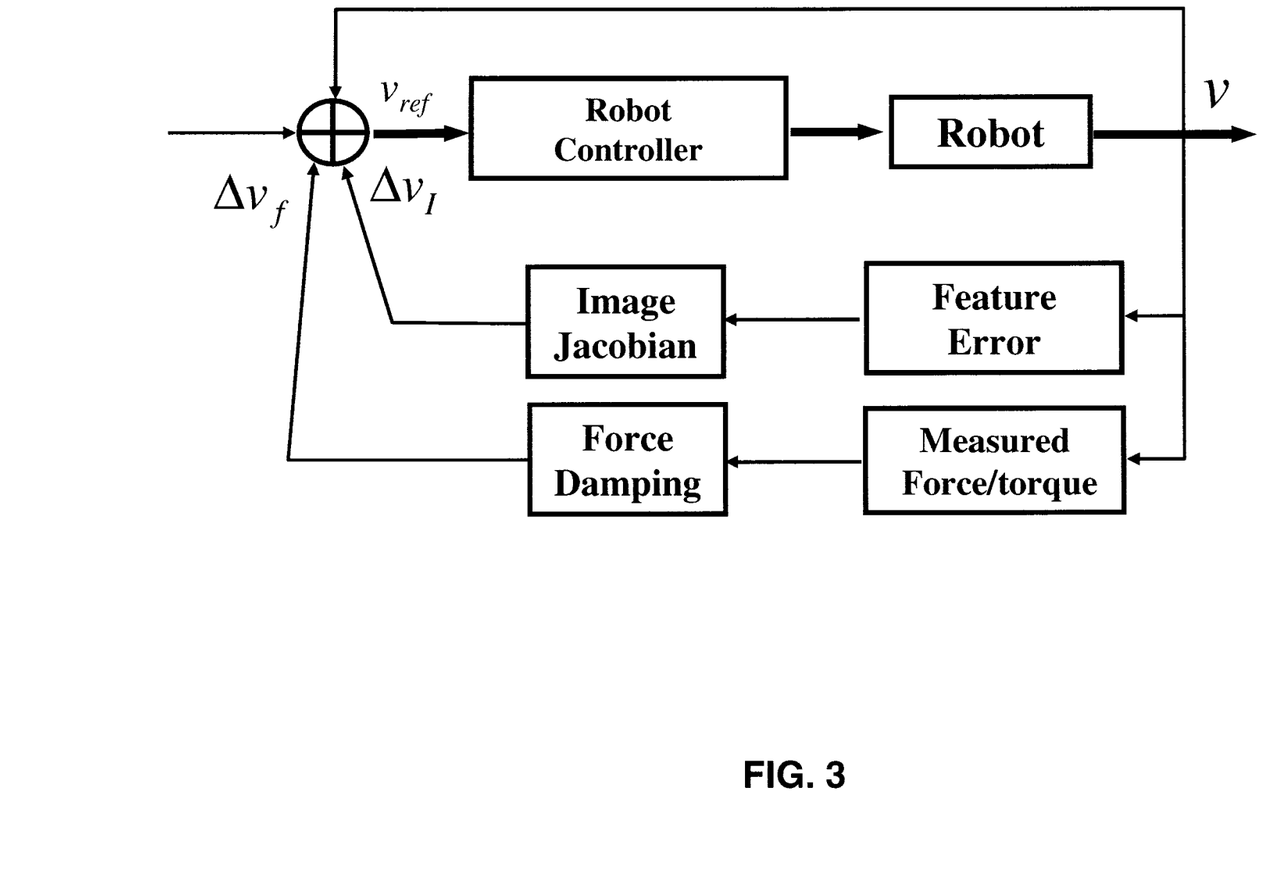
FIG. 3 shows the control methodology for the assembly task shown in FIG. 1.

FIG. 3 shows the control methodology. The reference velocity $v_{ref}$ is generated in the robot controller such as controller 104 shown in FIG. 7 for the robot 12 or in a computing device 102 connected to the controller 104 as is shown in FIG. 7, using the actual gripper (tool) velocity v, the velocity error $\Delta v_I$ computed from image processing and the velocity error $\Delta v_f$ by force control, as shown in the following equation:

$v_{ref} = v + \Delta v_I + \Delta v_f$

Where $\Delta v_I = J(X_d - X)$ $\Delta v_f = K^{-1}(F_d - F)$ $F_d$ and F are the desired force and actual measured contact force respectively. K is the damping coefficient. $X_d$ and X are respectively the desired position of the pre-defined feature which can be a feature, such as feature 44 of FIG. 6 that is part of and thus on the body of work piece 24 or an artificial marker on the work piece 24, and the actual position of the pre-defined feature. J is the Jacobian matrix.

Since the camera 28 is moving towards the insertion direction and is getting closer and closer to the feature, the desired feature position and Jacobian matrix are changing. Therefore, the desired feature position and Jacobian matrix is updated in real time.

Figure 4:
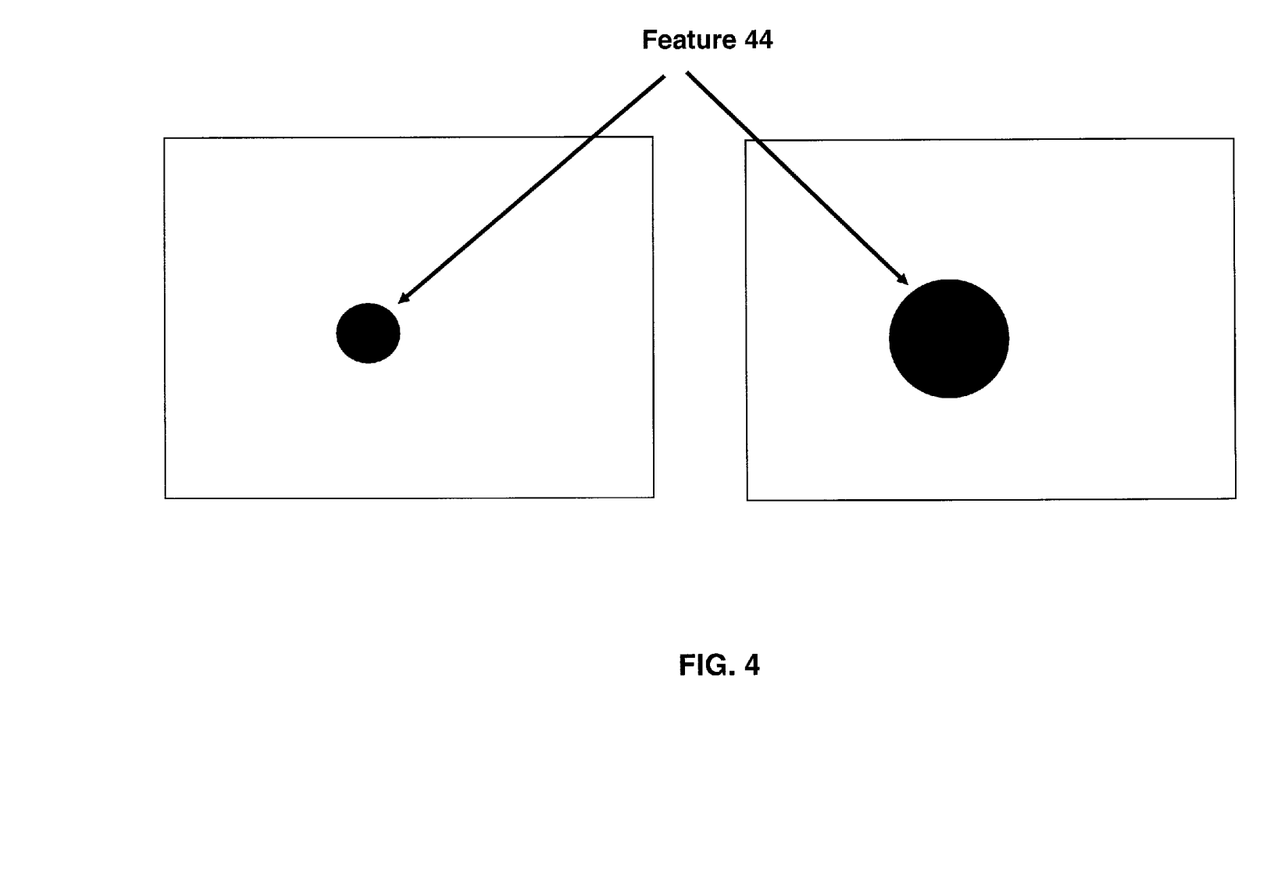
FIG. 4 shows two images for the pre-defined feature.

To simplify the computation, it is assumed that the camera frame is parallel to the frame attached to the moving assembly line 26. Therefore, there is only translation movement involved. As shown in FIG. 4, the size of the feature 44 changes and becomes larger as the camera 28 moves closer to the pre-defined feature 44. Therefore, the desired feature position and the feature size in the image frame are changing.

A 3D or 2D calibration method resident either in the controller 104 or a separate computing device 102 such as a PC could be used to identify the position of the pre-defined feature 44 of FIG. 6. Instead, the method and apparatus described herein uses a two point calibration method to compute the desired feature position and the feature size. As can be appreciated, the two point calibration method can be in the controller 104 of FIG. 7 or in a separate computing device 102 of FIG. 7 which can for example be a PC.

The feature 44 is measured at two positions: the start position and the end position. At both positions, the camera 28 takes images. After processing the images, the feature size ($R_0$ and $R_1$) and the center ($X_0$ and $X_1$) can be identified at the image frame. When the camera 28 moves from the start position to the end position, the desired feature center can be calculated as:

$$X = \frac{R - R_0}{R_1 - R_0}(X_1 - X_0) + X_0$$

where X and R are the desired feature center and actual feature size respectively. R is computed based on real time image processing.

The Jacobian should be updated in real time. Since R can be computed in real time, the image Jacobian can be updated:

$J = C J_0$

Where C is the scale. Assume $J_0$ is calibrated when the feature size is $R_0$, then $$C = \frac{R_0}{R}$$

Therefore, the Jacobian is calculated in real time.

FIG. 6 shows the pre-defined feature 44 and the studs 42 on the hub 40 in a laboratory mock up of an automobile wheel hub 40 and supporting part of the vehicle frame. The pre-defined feature 44 can, as was described above, be a feature that is on the body of the automobile when the automobile is sold or an artificial marker on a visible part of the vehicle body. The positioning relationship between the feature 44 and the studs 42 of the hub 40 can be computed by taking an image. The positioning relation can be used to correct the position difference among vehicles. If the feature 44 is on the car body, the position of the feature could be different from car to car. So too for the position of the hub 40. This difference can be measured by taking images of the feature 44 and studs 42 at the same image. If the feature 44 is an artificial one, it has to be measured since the position of the artificial markers differs from car to car.

In the example described above, the camera frame is assumed to be parallel to the frame attached to the moving assembly line 26. However, the moving line assembly methodology described herein can also be used when the camera frame is not parallel to the frame attached to the moving assembly line 26. In this case, the well known to those of ordinary skill in the art 2D/3D calibration method can be used to calibrate the relationship between the image frame and the work object frame. A transformation matrix is then obtained to transfer the coordinates in the images frame to those in the work object frame. Examples of this well known 2D/3D calibration method are described in R. J. Tsai, A Versatile Camera Calibration Technique for High Accuracy 3D Machine Vision Metrology Using Off-the-Shelf TV Cameras and Lenses, IEEE Journal of Robotics and Automation, Vol. 3, No. 4, 1987, pp. 323-344 and in Z. Zhang, A flexible new technique for camera calibration, IEEE Transactions on Pattern Analysis and Machine Intelligence, Volume 22, Issue 11, November 2000 Page(s): 1330-1334.

Figure 5:
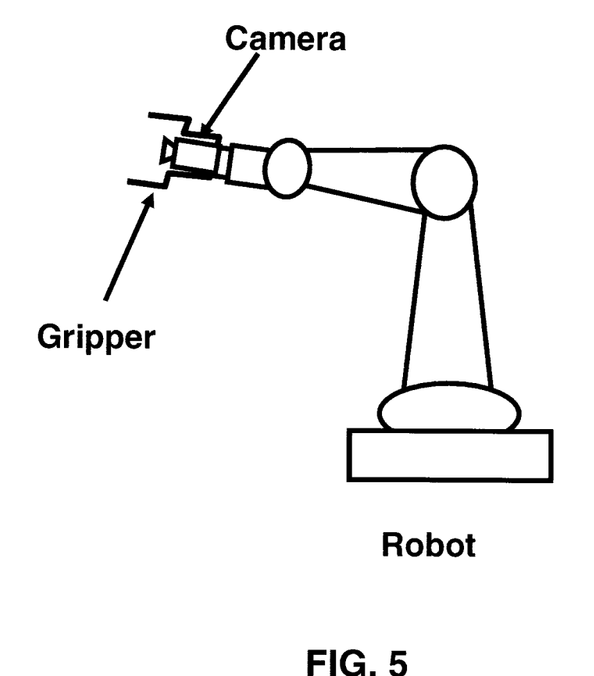
FIG. 5 shows an another embodiment for the system of FIG. 1 in which the camera is mounted the center of the robot tool.

As is shown in FIG. 1, the camera 28 is attached to the end of arm 18. The camera 28 can be set up anywhere, such as the center of the tool 22, as is shown in FIG. 5. Attaching the camera 28 to the center of tool 22, makes the method and apparatus described herein easier to implement as the camera 28 can always see the center of the work piece 34. The steps described above when the camera 28 is attached to the end of the robot arm 18 are also performed when the camera 28 is attached to the center of the tool 22.

As will be appreciated by one of skill in the art, the method and apparatus described herein may be embodied as a method, system, or computer program product. Accordingly, that method and apparatus may take the form of an entirely hardware embodiment, an entirely software embodiment (including firmware, resident software, micro-code, etc.) or an embodiment combining software and hardware aspects that may all generally be referred to herein as a "circuit," "module" or "system."

Furthermore, that method and apparatus may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus, or device and may by way of example but without limitation, be an electronic, magnetic, optical, electromagnetic, infrared, or semiconductor system, apparatus, device, or propagation medium or even be paper or other suitable medium upon which the program is printed. More specific examples (a non-exhaustive list) of the computer-readable medium would include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device.

Computer program code for carrying out operations of the method and apparatus described herein may be written in an object oriented programming language such as Java, Smalltalk, C++, C# or the like, or may also be written in conventional procedural programming languages, such as the "C" programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The method and apparatus herein is described above in connection with the process of loading a wheel on the hub of a motor vehicle moving on an assembly line. As was described above, in that embodiment the camera image is used to determine the orientation of the wheel to the studs on the hub and the robot reorients the wheel so that the holes on the wheel will line up with the studs on the hub when the robot mounts the wheel to the hub. It should be appreciated that there are other embodiments for this method and apparatus where it is not necessary to determine the orientation of the part with respect to the workpiece. For example, where the part is round in geometry and is to be mounted into a round receptacle in the workpiece either as a press fit part or onto a single central hub in the receptacle. It should also be appreciated the vision system may also be a 3D vision system that in combination with the force control is used to control movement of the robot to a position where the part can be assembled to the randomly moving workpiece.

As was described above, the method and apparatus herein may be implemented in the controller for the robot 12 or may be implemented in a system that includes a computing device that is connected to the controller. One example of such a system 100 is shown in FIG. 7 where the computing device 102 receives inputs from the vision system, that is, camera 28 and the force sensor 20 and provides an output to the robot controller 104. In this embodiment the computing device 102 includes software that performs the calculations used in the method and apparatus described herein to allow the assembly of a part to a workpiece that is randomly moving on an assembly line. The software that is used by computing device 102 to perform those calculations is on a suitable media in a form that can be loaded into the computing device 102 for execution. Alternatively, the software can be loaded into the computing device 102 or may be downloaded into the computing device 102, as described above, by well known means from the same site where computing device 102 is located or from another site that is remote from the site where device 102 is located. As another alternative, the software may be resident in computing device 102. In another embodiment not shown in FIG. 7, the system 100 does not include the computing device 102 but instead includes only the controller 104 and the software is either loaded into controller 104 from a suitable media or downloaded into the controller as described above for loading the software into controller 104 or resident in the controller and the controller 104 directly receives the inputs from the camera 28 and the force sensor 20.

As can be appreciated by those of ordinary skill in the art, when the method is implemented in software in computing device 102 or controller 104, the computing device or controller functions to execute the software to thereby make the calculations of the method and system described above. The controller 104 is connected to robot 12 which is used to perform the assembly 106 of a part on a randomly moving workpiece that is described above. Thus, if the software is executed by controller 104 or if the controller 104 receives commands from computing device 102 that executes the software for the technique, the robot 12 is controlled to perform the assembly process 106 in accordance with the method and system described herein. It should be appreciated that the technique described herein can be implemented on the robot controller 104 as a software product, or implemented partly or entirely on the computing device 102 which communicates with the robot controller 104 via a communication network, such as, but not limited to, the Internet.

It is to be understood that the description of the foregoing exemplary embodiment(s) is (are) intended to be only illustrative, rather than exhaustive, of the method and system described herein. Those of ordinary skill will be able to make certain additions, deletions, and/or modifications to the embodiment(s) of the disclosed subject matter without departing from the spirit of the invention or its scope, as defined by the appended claims.

What is claimed is:

1. An apparatus for controlling an industrial robot having an end arm to assemble a part to a predetermined location on a randomly moving workpiece, said robot comprising a force sensor mounted on said end arm and a tool mounted to said force sensor and a vision system mounted on said robot, said apparatus comprising:

a computational device configured to cause said robot to grip said part with said tool mounted to said force sensor and use signals from said vision system to compute a position and size of a predefined feature located on said workpiece at other than said predetermined location to establish a positioning relationship between said predetermined location and said predefined feature located on said workpiece and then using said positioning relationship and signals, at the same time, from both said force sensor mounted on said robot end arm and said vision system of said predetermined location to control movement of said robot gripping said part with said tool mounted to said force sensor to a position where said gripped part can be assembled by said robot to said predetermined location on said randomly moving workpiece, wherein said computational device uses said signals from said vision system to determine the orientation of said gripped part to the orientation of said predetermined location on said workpiece, and causes, in response to said determination of the orientation of said gripped part to the orientation of said workpiece predetermined location, said robot to reorient said gripped part to match said orientation of said workpiece predetermined location, and wherein said tool with said gripped part has a velocity and said computational device for using said signals, at the same time, from both said vision system and said force sensor to control movement of said robot and calculating from said vision system signal a velocity error of said moving workpiece and from said force sensor signal a force velocity error and uses said calculated moving workpiece and force velocity errors and said gripper velocity to calculate a reference velocity for said controlled movement of said robot.

2. The apparatus of claim 1 wherein said computational device uses said signals from said vision system to determine the position and orientation of said part so that said robot can grip said part.

3. The apparatus of claim 1 wherein said workpiece is randomly moving on an assembly line and said robot moves to a first position related to a first trigger on said moving assembly line, said computational device using when said robot is at said first position said signals from said vision system to determine the position and orientation of said workpiece predetermined location to which said gripped part is to be assembled.

4. The apparatus of claim 3 wherein said robot moves to a second position related to a second trigger on said moving assembly line, said computational device using when said robot is at said second position said signals from said vision system to calculate a velocity error of said moving workpiece.

5. A method for using an industrial robot having an end arm to assemble a part gripped by said robot to a predetermined location on a randomly moving workpiece comprising:

using in a computational device signals from a vision system mounted on said robot to compute a position and size of a predefined feature located on said workpiece at other than said predetermined location to establish a positioning relationship between said predetermined location and said predefined feature located on said workpiece;

using said positioning relationship and signals, at the same time, from a force sensor mounted on said end arm and said vision system of said predetermined location to control movement of said robot gripping said part with a tool mounted to said force sensor to a position where said gripped part can be assembled by said robot to said predetermined location on said randomly moving workpiece; and using said signals from said vision system to determine the position and orientation of said part so that said robot can grip said part, wherein said gripping tool has a velocity, and said computational device uses said signals, at said same time, from both said vision system and said force sensor to control movement of said robot and further comprises: calculating from said vision system signals a velocity error of said moving workpiece and from said force sensor signals a force velocity error; and uses said calculated moving workpiece and force velocity errors and said gripping tool velocity to calculate a reference velocity for said controlled movement of said robot.

6. The method of claim 5 further comprising: using said signals from said vision system to determine the orientation of said gripped part to the orientation of said predetermined location on said workpiece; and causing, in response to said determination of the orientation of said gripped part to the orientation of said workpiece predetermined location, said robot to reorient said gripped part to match said orientation of said workpiece predetermined location.

7. The method of claim 5 further comprising using said signals from said vision system and said force sensor to calculate a reference velocity for said controlled movement of said robot.

8. A system for controlling an industrial robot to assemble a part to a predetermined location on a randomly moving workpiece comprising:

an industrial robot comprising an end arm, a force sensor mounted on said end arm and a tool mounted to said force sensor and a vision system mounted on said robot; and a computational device connected to said robot and configured to control said robot, said computational device responsive to signals from said vision system to compute a position and size of a predefined feature located on said workpiece at other than said predetermined location to establish a positioning relationship between said predetermined location and said predefined feature located on said workpiece and then use said positioning relationship and signals, at the same time, from both said force sensor and said vision system of said predetermined location to control movement of said robot after said robot has gripped said part with said tool mounted to said force sensor to a position where said gripped part can be assembled by said robot to said predetermined location on said randomly moving workpiece, wherein said computational device uses said signals from said vision system to determine the orientation of said gripped part to the orientation of said predetermined location on said workpiece and causes, in response to said determination of the orientation of said gripped part to the orientation of said workpiece predetermined location, said robot to reorient said gripped part to match said orientation of said workpiece predetermined location, and wherein said tool with said gripped part has a velocity and said computational device for using said signals, at the same time, from both said vision system and said force sensor to control movement of said robot and calculating from said vision system signal a velocity error of said moving workpiece and from said force sensor signal a force velocity error and uses said calculated moving workpiece and force velocity errors and said gripper velocity to calculate a reference velocity for said controlled movement of said robot.

9. A system controlling an industrial robot having an end arm to assemble a part to a predetermined location on a randomly moving workpiece, a force sensor mounted on said end arm and a tool mounted to said force sensor said control system comprising:

a computing device having therein program code usable by said computing device, said program code comprising:

code configured to cause said robot to grip said part using said tool mounted to said force sensor; and code configured to use signals from a vision system mounted on said robot to compute a position and size of a predefined feature on said workpiece at other than said predetermined location to establish a positioning relationship between said predetermined location and said predefined feature located on said workpiece and then use said positioning relationship and signals, at the same time, from both said force sensor mounted on said robot end arm and said vision system of said predetermined location to control movement of said robot to a position where said gripped part can be assembled by said robot to said predetermined location on said randomly moving workpiece;

code configured to use said signals from said vision system to determine the orientation of said gripped part to the orientation of said predetermined location on said workpiece and to cause, in response to said determination of the orientation of said gripped part to the orientation of said workpiece predetermined location, said robot to reorient said gripped part to match said orientation of said workpiece predetermined location; and code configured to use a velocity of said tool used with gripping said part, said signals, at the same time, from both said vision system and said force sensor to control movement of said robot and to calculate from said vision system signal a velocity error of said moving workpiece and from said force sensor signal a force velocity error and to use said calculated moving workpiece and force velocity errors and said gripper velocity to calculate a reference velocity for said controlled movement of said robot.

10. A computer program product on a tangible non-transient computer readable media for controlling an industrial robot having an end arm, a force sensor mounted on said end arm and a tool mounted to said force sensor to assemble a part gripped by said tool to a predetermined location on a randomly moving workpiece, said computer program product comprising:

computer usable program code configured to cause said robot to grip said part with said tool; and computer usable program code configured to use signals from a vision system mounted on said robot to compute a position and size of a predefined feature on said workpiece at other than said predetermined location to establish a positioning relationship between said predetermined location and said predefined feature located on said workpiece and then use said positioning relationship and signals, at the same time, from both said force sensor mounted on said robot end arm and said vision system of said predetermined location to control movement of said robot to a position where said part gripped by said tool can be assembled by said robot to said predetermined location on said randomly moving workpiece;

computer usable program code configured to use said signals from said vision system to determine the orientation of said gripped part to the orientation of said predetermined location on said workpiece and to cause, in response to said determination of the orientation of said gripped part to the orientation of said workpiece predetermined location, said robot to reorient said gripped part to match said orientation of said workpiece predetermined location; and computer usable program code configured to use a velocity of the gripping tool and said signals, at the same time, from both said vision system and said force sensor to control movement of said robot and calculating from said vision system signal a velocity error of said moving workpiece and from said force sensor signal a force velocity error and uses said calculated moving workpiece and force velocity errors and said gripper velocity to calculate a reference velocity for said controlled movement of said robot.

* * * * *